Sept. 6, 1966  W. J. HARPER ET AL  3,270,855
BARREL TREATMENT MACHINE FOR SMALL ARTICLES
Filed April 8, 1964  8 Sheets-Sheet 1

INVENTOR
Willard J. Harper
& Paul A. Hauck

BY Wilkinson, Mawhinney & Theibault
ATTORNEYS

Sept. 6, 1966     W. J. HARPER ETAL     3,270,855
BARREL TREATMENT MACHINE FOR SMALL ARTICLES
Filed April 8, 1964     8 Sheets-Sheet 4

INVENTOR
Willard J. Harper
& Paul A. Hauck

BY Wilkinson, Mawhinney & Theibault
ATTORNEYS

INVENTOR
Willard J. Harper
& Paul A. Hauck

BY Wilkinson, Mawhinney & Theibault
ATTORNEYS

Sept. 6, 1966 W. J. HARPER ET AL 3,270,855
BARREL TREATMENT MACHINE FOR SMALL ARTICLES
Filed April 8, 1964 8 Sheets-Sheet 6

INVENTOR
Willard J. Harper
& Paul A. Hauck

BY Wilkinson, Mawhinney & Theibautt
ATTORNEYS

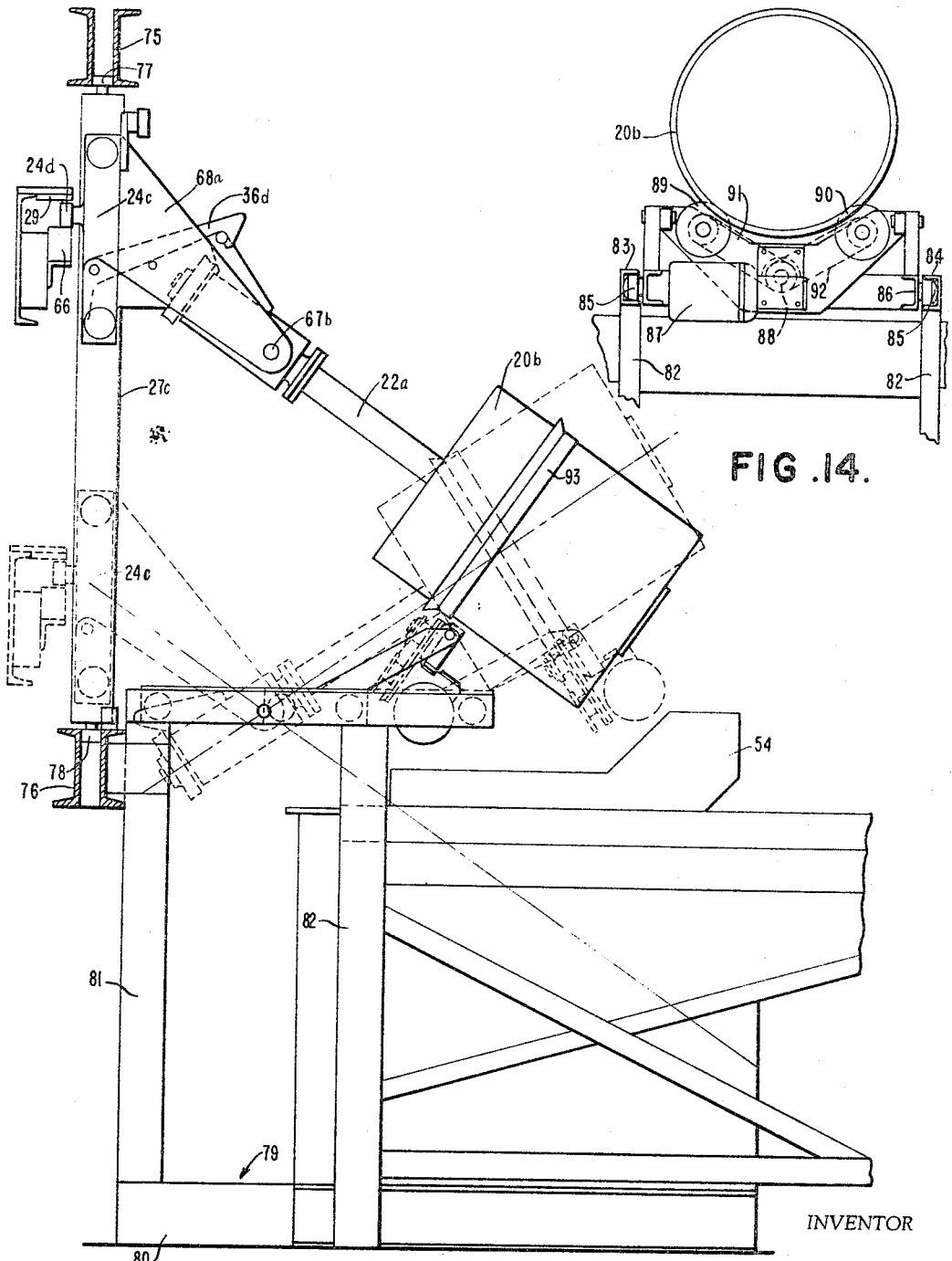

United States Patent Office 3,270,855
Patented Sept. 6, 1966

3,270,855
BARREL TREATMENT MACHINE FOR SMALL ARTICLES
Willard J. Harper, Colts Neck, and Paul A. Hauck, Freehold, N.J., assignors to Hanson-Van Winkle-Munning Co., Matawan, N.J., a corporation of New Jersey
Filed Apr. 8, 1964, Ser. No. 358,188
19 Claims. (Cl. 198—19)

The present invention relates to Barrel Treatment Machine for Small Articles, and more particularly relates to a machine comprising perforated barrels into which small articles are introduced at a loading station and thereafter moved by a conveying mechanism in sequence from one to another of a series of tanks containing various solutions, into which tanks the barrels are automatically lowered and rotated for preselected time intervals subsequent to which the automatic mechanism raises the barrels to clear tank walls and advances the barrels to subsequent tanks into which they are lowered, which action proceeds throughout a predetermined cycle to an unload station where the treated articles are dumped and eventually delivered to a final destination for commercial distribution; while the barrel continues back to the origin point, namely the filling or load station, if desired through further steps of immersion in other treatment tanks for cleaning and performing other operations upon the barrel to place the same in readiness to receive a fresh supply of the articles when again arriving at the load station.

Those skilled in the art will understand that the operations referred to involve treatments such as phosphatizing, chromatizing, electroplating, all including subjection to liquids for cleansing, rinsing, chemical activity, drying, oxidation, burnishing, abrading, polishing, etc.

This general type of machine and operation are illustrated, for example in the Hannon Patents No. 1,895,622, granted January 31, 1933; Reissue No. 19,560, granted May 7, 1935, and in Patents 2,148,552, granted February 28, 1939 and 2,177,982, granted October 31, 1933, these patents being only exemplary of this art.

Such prior art patents involve a horizontal conveying mechanism for moving the perforated barrels horizontally around in a closed circuit, the shafts of the barrels being carried by slides which travel vertically in vertical channel guides and are raised and lowered by an elevating mechanism in shifting the barrels from tank to tank. Provision is also made for rotating the barrels when in operative position in the tanks.

Such prior art does not involve a horizontal conveying mechanism for moving the perforated barrels horizontally around in a closed circuit with the shafts of the barrels being carried by slides which travel vertically in vertical channel guides and which are raised and lowered by a vertical elevating mechanism in shifting the barrels from tank to tank.

It is an object of the invention to provide, in association with the slides, barrel supports through the shafts thereof which will permit an increased amplitude of angular movement of the barrel about its shaft in an axial sense to achieve a new low position at load station whereby the axis of the barrel is substantially upright permitting greater facility of loading the articles into the open upper end of the barrel, and at the unload station to permit raising of the barrel to an unprecedented high angular position in which the open end of the barrel will be presented in a more favorable downward attitude for promoting fast and complete dumping of the load.

It is a further object of the invention to supplement the above increased amplitude movements of the barrel through the support it receives from its shaft by certain means at the filling station for cushioning the angular descent of the barrel and subsequently, after filling, raising the barrel to an operative position in which the barrel support becomes latched in its slide so that normal operation of the machine may proceed to the unload station at which means is provided for raising the barrel to the new high position for dumping and, if desired, for also communicating rotary movement to the barrel to agitate the contents in a manner to increase article evacuation.

In a more specific aspect, it is a further object of the invention to so modify the slide as to provide an interleaved construction thereof in which the leaves or plates have pivotal or hinging movement with one another and as a unit with the slide with a latch between the slide and the unit with means for automatically tripping the latch on arrival at load station.

An important object of the present invention is to increase barrel capacity without dumping contents when raising and lowering the barrel over treatment tank walls.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 13 is a side elevational view with the barrel and associated parts shown in full lines in operative position and in dotted lines in an unload position.

FIGURE 14 is an end elevational view of the same.

Figure 1:
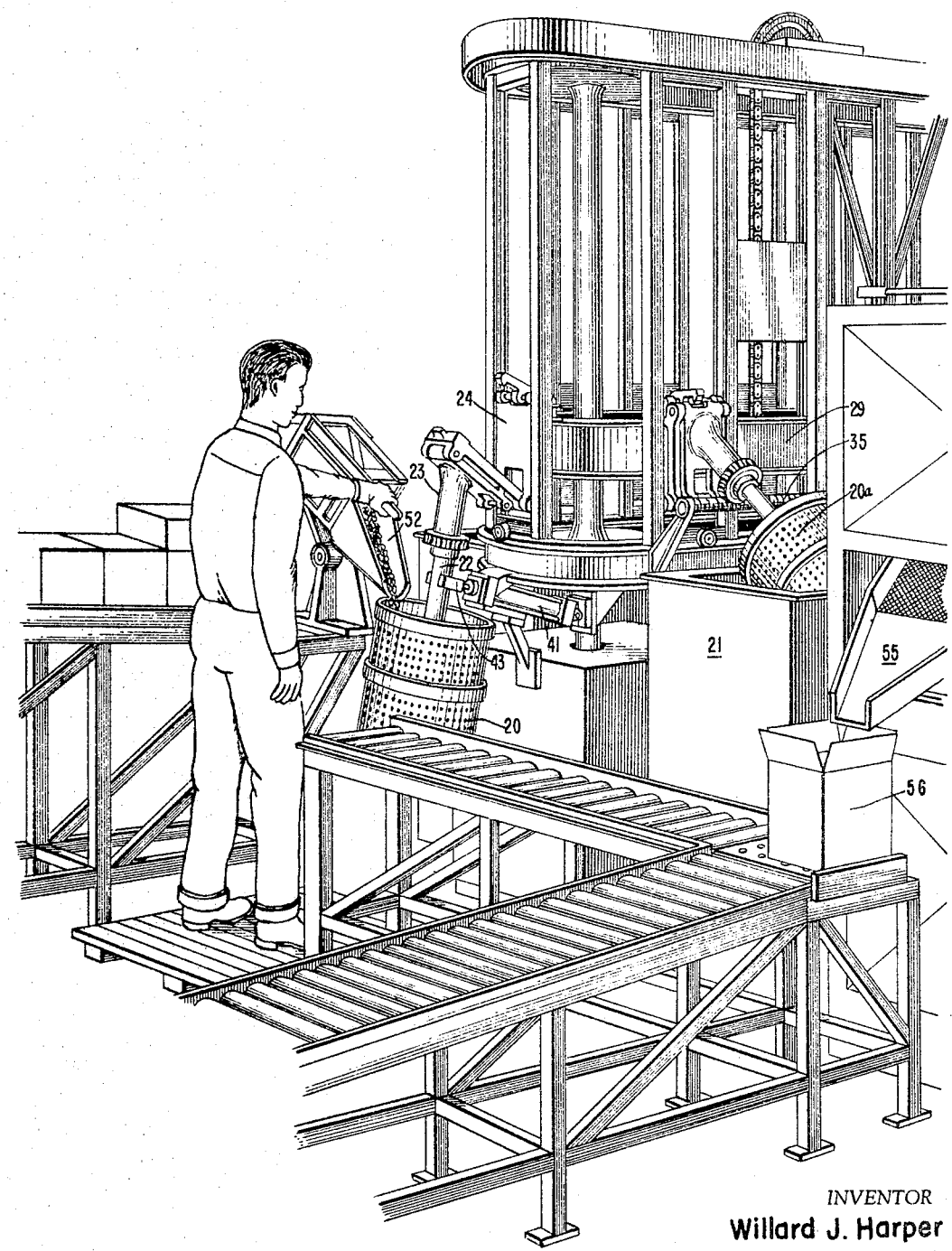
FIGURE 1 is a fragmentary perspective view of a machine constructed in accordance with the present invention showing more particularly the load station.

Referring more particularly to the drawings and for the present to FIGURES 1 to 5 inclusive, in FIGURE 1 particularly a perforated barrel 20 is shown in its lowermost position at the load station, and a second perforated barrel 20a is shown as extending down angularly into a final treatment tank 21 just prior to its advance to the load station.

Figure 2:
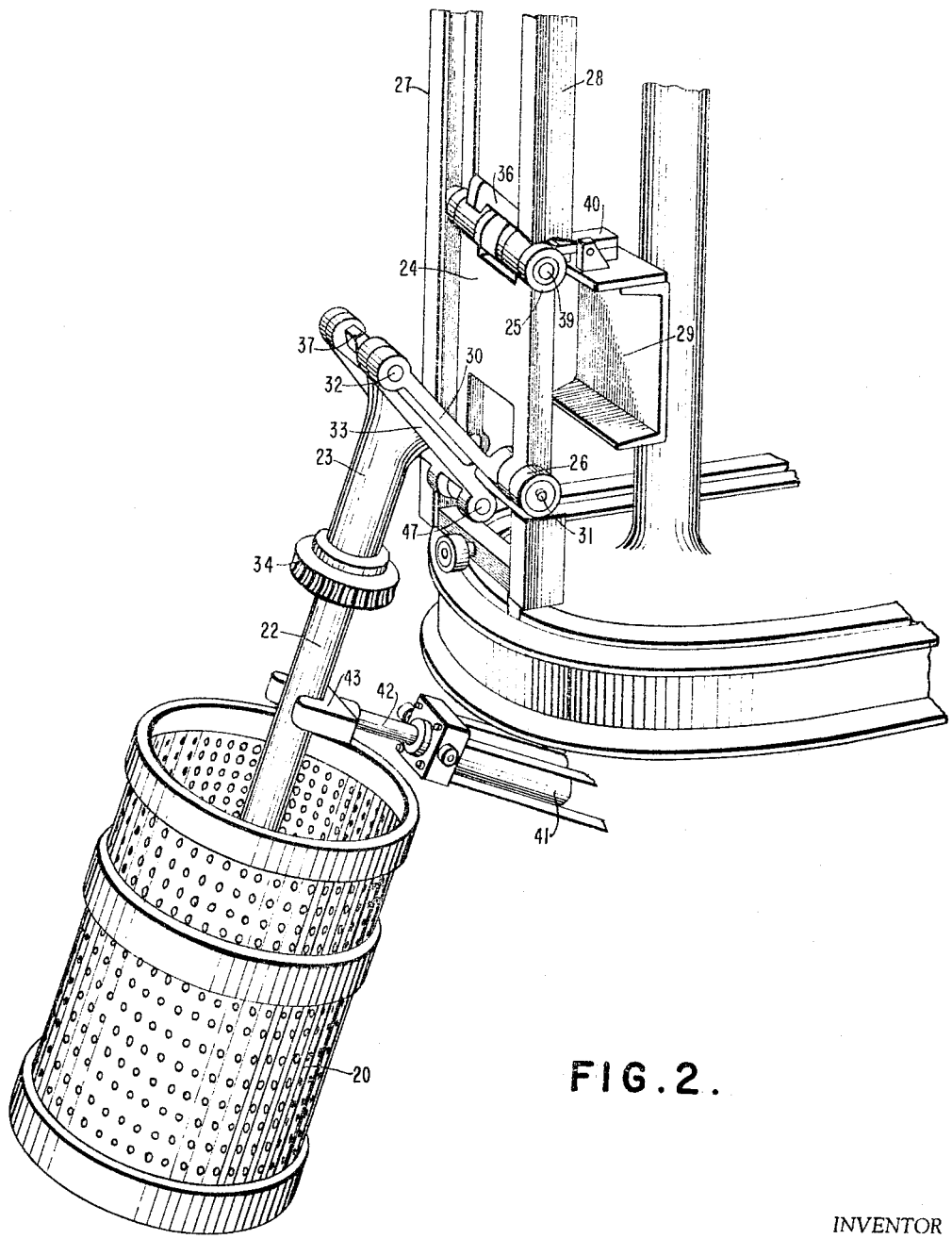
FIGURE 2 is also a perspective view taken on an enlarged scale showing in greater detail the positions of the involved parts at the load station.

As shown more particularly in FIGURE 2, the barrels 20 are carried on shafts 22 journalled for rotation in bearings 23 ordinarily carried by slides 24 which are slidable on rollers 25 and 26 running up and down vertically in pairs of channels guides 27 and 28 carried around horizontally with the conveying mechanism.

The elevating mechanism is indicated at 29 to which all of the slides 24 are connected for the periodic raising and lowering movements as well understood in this art.

Pursuant to the invention, intermediate leaves or plates 30 are pivoted, as indicated at 31, at their lower end portions to the lower end portions of the vertically adjustable slides 24. To the upper end portions of the intermediate plates 30 are pivoted, as indicated at 32, the upper end portions of outer leaves or plates 33 to which are directly secured the bearings 23 of the barrel shafts 22 in the usual angular relationship for holding the barrels in the position 20ª of FIGURE 1 during the processing operation at the various stations.

In the conventional manner worm wheels 34 are affixed to the barrel shafts 22 in position to engage rotary worms 35 as shown in FIGURE 1 when the barrels are in the operative position in the tanks for the purpose of imparting rotation to the barrels. When the elevating mechanism 29 lifts the barrels preliminarily to a horizontal shift the worm wheels 34 will be lifted from the worms 35 so as to suspend rotary motion of the barrels when being transferred from one tank to another.

Figure 4:
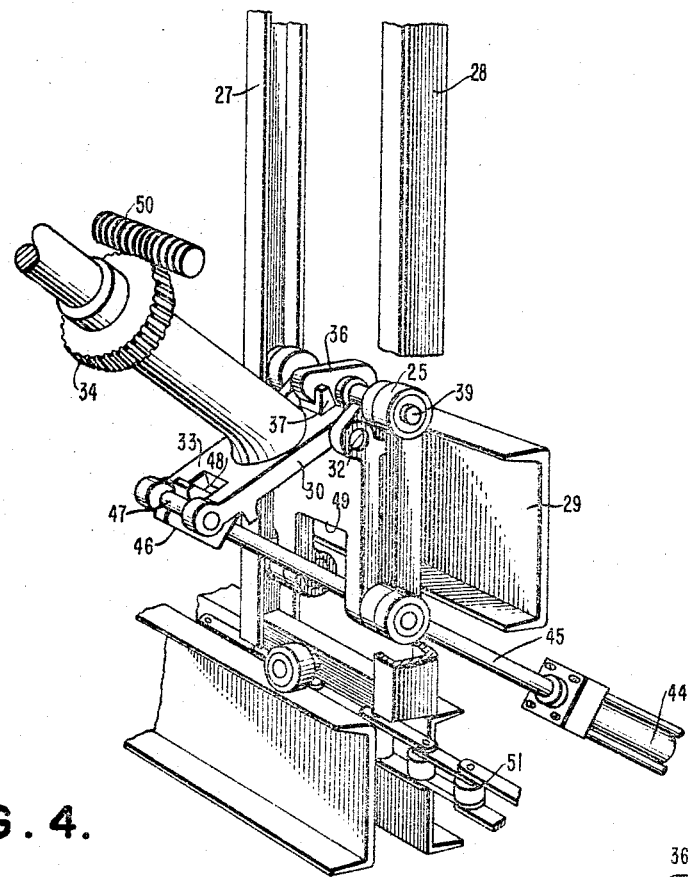
FIGURE 4 is a fragmentary perspective view showing the position of the involved parts at the unload station.
Figure 5:
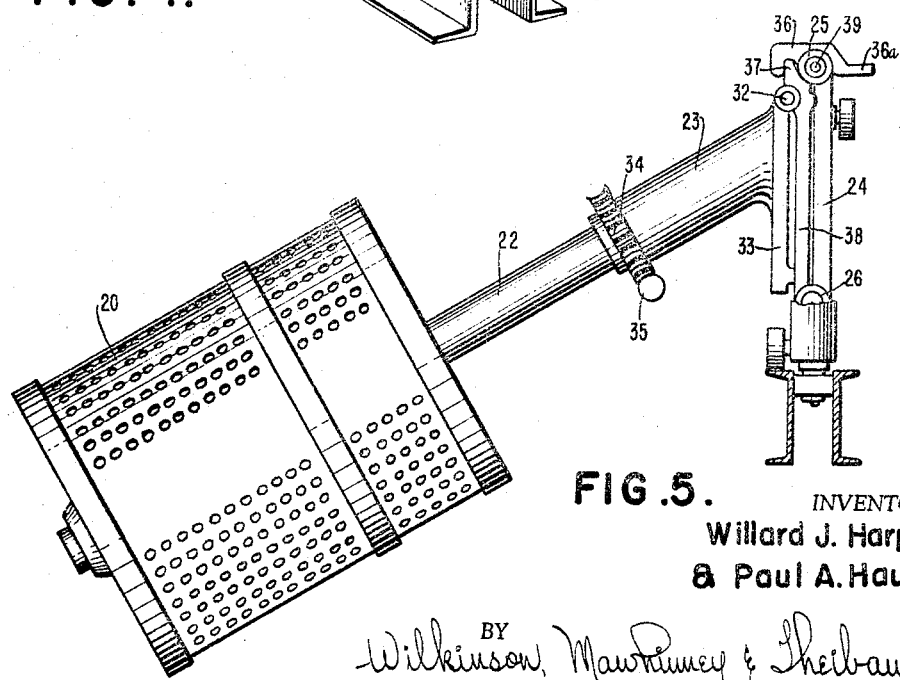
FIGURE 5 is a side elevational view showing the position of the parts when the barrel is in operative position at least partially immersed in a treatment tank.
Figure 6:
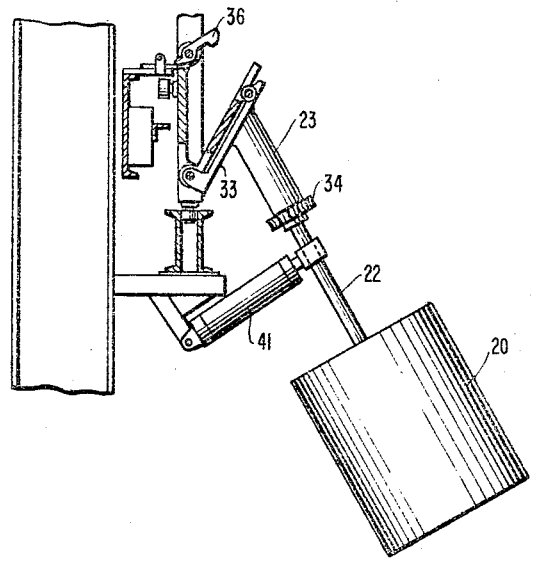
FIGURE 6 shows the relationship of the parts at the filling station.

As seen more particularly in FIGURES 2, 4 and 5, latches 36 on the upper portions of the slides 24 are adapted to interlockingly engage latch strikes or projections 37 on the upper portions of the intermediate plates 30. The latches may be pivoted to the upper portions of the slides 24, the pintles or pivot pins 39 for the rollers 25 serving as axes about which the latches 36 may rotate.

As best seen in FIGURE 5 the latches 36 have tailpieces 36ª positioned to be encountered by a cam or other tripping mechanism 40 located at the load station for raising the latches from engagement with the keepers 37.

As shown in FIGURES 1 and 2, at the load station is a hydraulic or other mechanism 41 having a ram or plunger rod 42 carrying a claw 43 positioned to be engaged by the barrel shafts 22 in the descending angular movements of the barrels into filling or load position.

As shown in FIGURE 4, at the unload station a hydraulic or other mechanism 44 is located with a ram or plunger rod 45 carrying a claw 46 adapted to engage a rod 47 spanning a slot 48 made in the lower portion of the outer plate 33. This mechanism acts through cutout portions 49 in the slide 24 and intermediate plate 30 to rotate the outer plate 33 about the axis 32 incident to lifting the barrel to the high discharge position shown in FIGURES 3 and 4 in which the worm wheel 34 may engage a worm 50 attached to a suitable part of the framework of the machine and connected to be driven by the power mechanism of the machine for the purpose of rotating the barrel in this unload position to promote more effectual discharge of the contents.

In FIGURE 4 a part of the horizontal conveying mechanism is indicated at 51.

In operation, barrel 20ª is shown in FIGURE 1 as in a last treatment tank in an operative position therein with the worm wheel 34 engaging the worm 35, which latter is constantly rotated and therefore communicates rotation to the shaft 22 and the barrel 20ª. When this last treatment operation is completed the elevating mechanism 29 is raised, lifting therewith the slide 24 and the barrel 20ª to a height where the barrel will clear the wall of the tank 21; thereupon the conveying mechanism is timed to move the barrel 20ª around to the left to the load station.

On arriving at the load station the elevating mechanism 29 is lowered, thus lowering therewith the slide 24 and the entrained parts including the barrel. Incident to this movement the latch 36 is tripped to release the unit comprising the plates 30 and 33. Due to incumbent weight the unit will drop down, rotating about the center 31 to the positions shown in FIGURES 1 and 2. Incident to this rotation the shaft 22 will enter the claw 43 which will be in a projected position. Thus the hydraulic ram 41 will act as a dash-pot cushioning the lowering movement or the end portion of the lowering movement of the barrel 20. In the final near vertical position of the shaft 22 the upper open end of the barrel is suitably positioned to receive a supply of small articles through a tiltable chute 52.

After filling, the hydraulic ram 41 is actuated to lift the shaft 22 and the entrained plate unit 30, 33 about the center 31 back to the position of FIGURE 5 at which the latch 36 automatically re-engages the projection 37. The great weight of the barrel 20 plus its contents will cause the shaft 22 to gravitate downwardly upon the claw 43 thus preventing the opening of the outer plate 33 by swinging away from the upper center 39.

Figure 7:
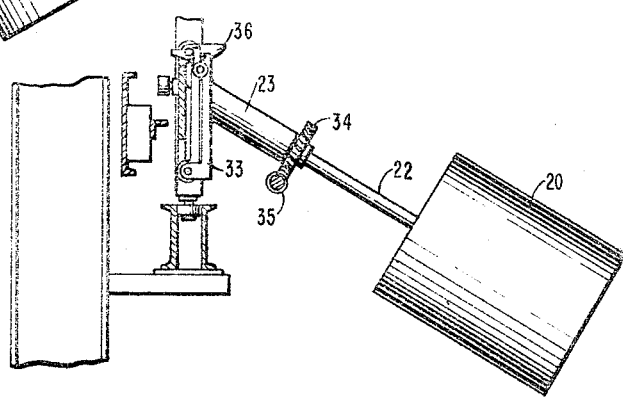
FIGURE 7 is a similar view showing the relative positions of the parts in the operative position of the barrel within the tank.

Once the parts have been restored to the positions of FIGURES 5 and 7, the elevating mechanism 29 is timed to rise and the conveying mechanism 51 to move on one of its intermittent strokes to carry the elevated charged barrel 20 around to the treatment tanks 53 at the opposite side of the machine.

Figure 3:
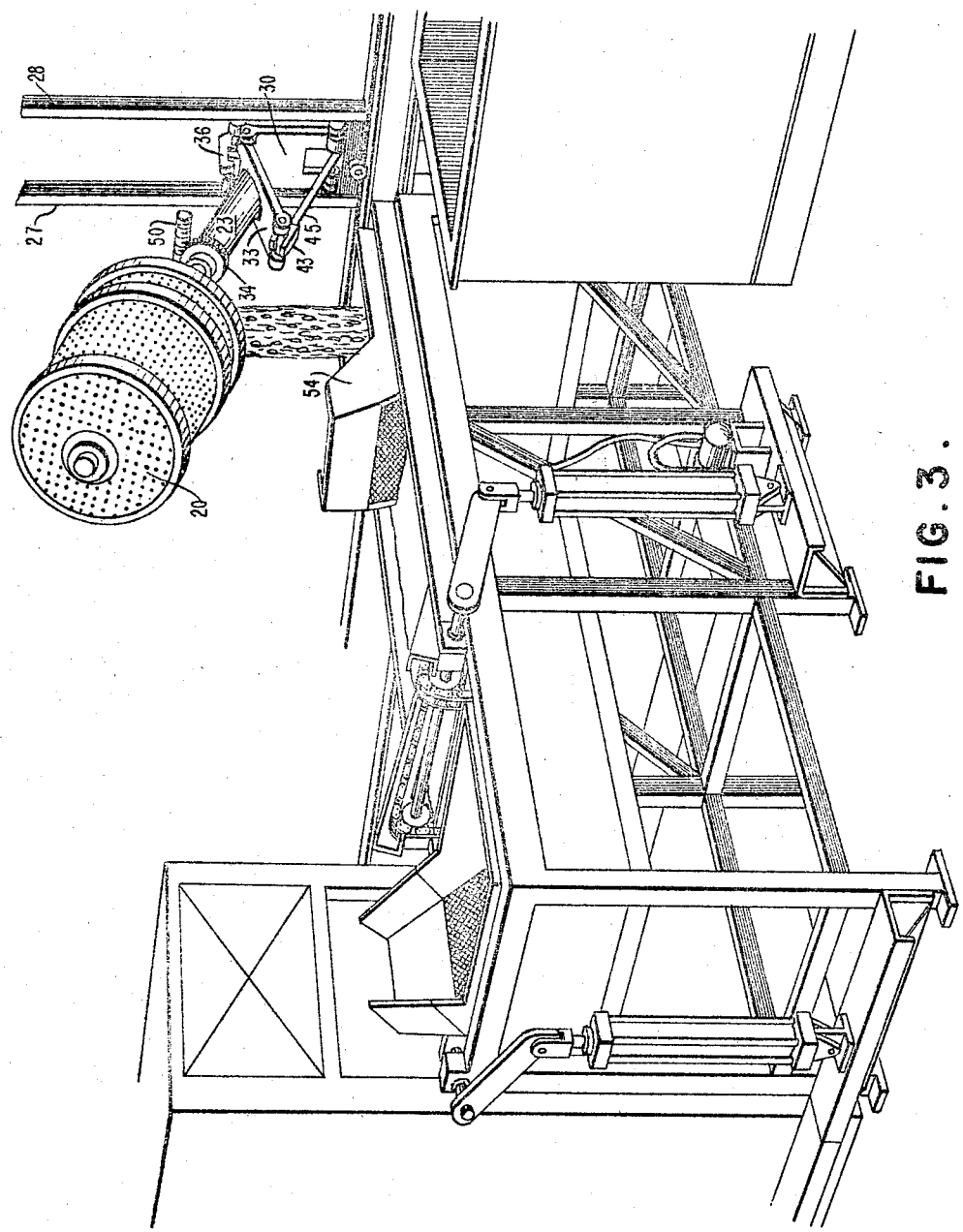
FIGURE 3 is a perspective view showing the position of the parts and barrel at the unload station.
Figure 8:
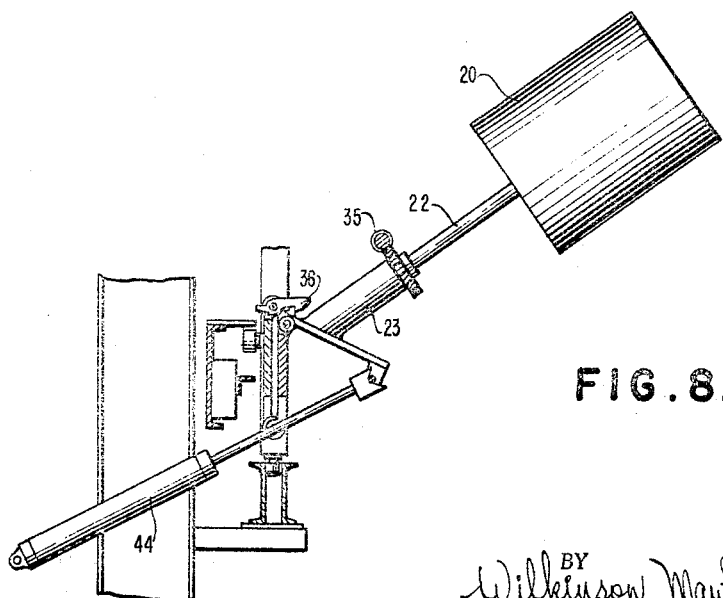
FIGURE 8 shows the position of the parts at the unload station.

The treatment sequence is then resumed and after the barrel 20 arrives at the unload station of FIGURES 3 and 4 the ram or hydraulic motor 44 is actuated to project the plunger rod 45 and its claw 46 which engages the rod 47 on the lower end of the outer plate 33, thus rocking the outer plate 33 about the center 32 and swinging the barrel upwardly to decanting position as shown in FIGURES 3 and 8. To facilitate discharge of the small articles into the tray 54, the worm wheel 34 will be arranged to contact the rotary worm 50 in this raised unload position.

After unloading the fluid in hydraulic cylinder 44 is released and the weight of the barrel and entrained parts will cause the same together with the outer plate 33 to descend in a rotary motion about the pivot 32 until the operative position of FIGURES 5 and 7 is arrived at. The barrel is then moved from the unload to the load station through treatment tanks 21.

After some subsequent operations have been performed on the discharged articles the same are delivered by chute 55 to a container 56 which may be then delivered to a conveyor for commercial destination.

Referring more particularly to the form of invention shown in FIGURES 9, 10 and 11, 27ª shows a vertical channel guide of which the companion guide is of similar construction and the slide 24ª is slidable vertically in the guides on rollers 25ª and 26ª.

Figure 9:
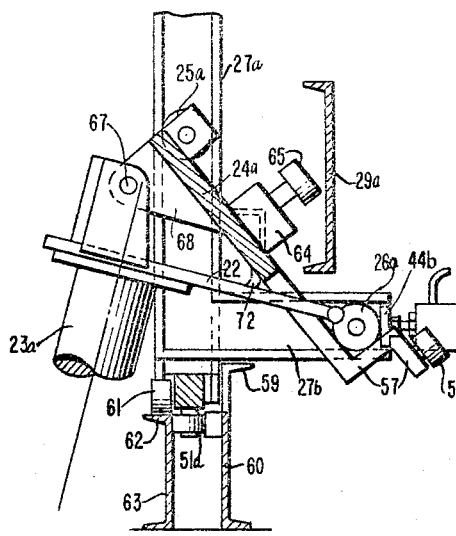
FIGURE 9 is a vertical sectional view of a modified form of device shown at load position.

The guides are modified in that they are provided with horizontal extensions 27ᵇ in which the lower rollers 26ª may slide incident to the load position of FIGURE 9. A pneumatic or hydraulic cylinder 44ª having a ram 44ᵇ may be employed for engaging roller 26 for urging it upwardly of the slot 27ᵇ, raising the arm 23ª from the position shown in FIGURE 9 of loading to the operating position of FIGURE 10.

At the lower end the slide 24ª may be provided with an offset 57 carrying rollers 58 adapted to occupy positions in rolling engagement with the upper surface of a flange 59 on the upper end of a structural beam 60 forming part of the framework of the machine.

Spaced forwardly of the rollers 58 are other similar rollers 61 supporting the guide 27ª and other movable parts of the machine from a flange 62 at the upper end of a structural beam 63 of the framework. Between the beams 60 and 63 the conveying mechanism 51ª operates.

The slides 24ª have horizontal beams 64 carrying inwardly projecting extensions 65 which may or may not be in the form of rollers positioned to be contacted by lift members 66 of the elevating mechanism 29ª.

The bearings 23ª for the barrel shafts are pivoted as at 67 to webs 68 outstanding from the slides 24ª.

Plates 69, preferably substantially normal to the center line of the bearings 23ª, are affixed thereto having rods 70 adapted to be engaged by plunger rams 71 which may be parts of hydraulic motors of the type heretofore identified at 41 and 44.

Figure 10:
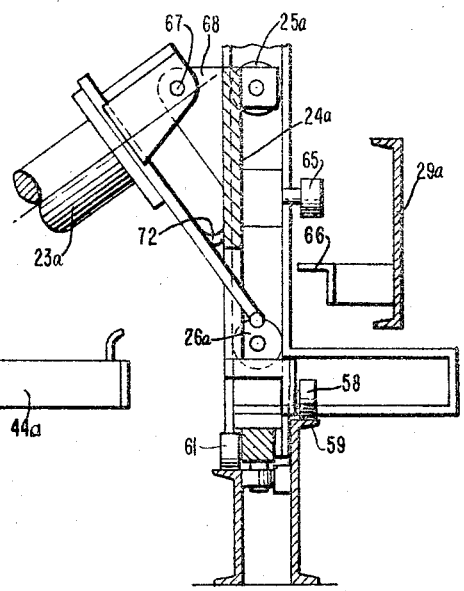
FIGURE 10 is a similar view showing the parts in operating position.

In the use of this form of the invention, when the slides are in the lower normal position of FIGURE 10, the bearings 23ª may be held in a substantially diagonal position by the engagement of lugs 72 against the slides 24ª.

When the slides 24ª are in the position of FIGURE 9, the bearings 23ª may drop to more upright positions supporting the barrels for filling at the load station.

Figure 11:
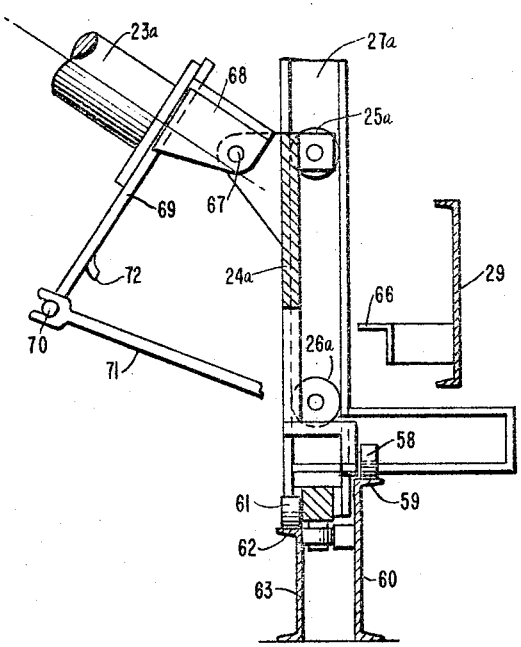
FIGURE 11 is also a vertical sectional view with the parts in unload position.

At the unload station, illustrated in FIGURE 11, the rams 71 have shifted the bearings 23ª outwardly and upwardly to an unload position.

Figure 12:
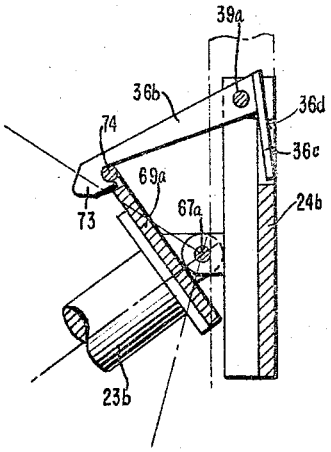
FIGURE 12 is a fragmentary vertical section of a further modified form of device employing a latch.

Referring more particularly to FIGURE 12, a latch 36ᵇ having a tailpiece 36ᶜ is pivoted at 39ª on the slide 24ᵇ. The latches 36ᵇ have hooks 73 adapted to engage about rods 74 on the upper ends of plates 69ª which are affixed to bearings 23ᵇ; the bearings are pivoted at 67ª to the slides. The detent latch 36ᵇ is prohibited from falling to a position of not engaging the rod 74 by reason of the latch tailpiece 36ᶜ striking a stop 36ᵈ.

When the latch 36ᵇ is disengaged, by a tripping device pushing out upon tailpiece 36ᶜ, the bearing 23ᵇ may fall to the load position or may be raised to an unload position. The latch 36ᵇ will hold the parts in normal operating position as when the barrel is in a tank.

As heretofore stated, machines of the type herein involved are generally termed in the industry as barrel machines. However, the invention may be applicable to so-called "side arm" machines and in the claims the word "barrel" is used for convenience to refer to any type of container.

Referring more particularly to FIGURES 13 and 14, 75 indicates a pair of spaced structural overhead beams and 76 a pair of spaced lower structural beams of the machine which receive horizontal rollers 77 and 78 of vertical channel guide beams 27ᶜ in which are mounted vertical slides 24ᶜ shown in full lines in the upper position in FIGURE 13 and in dotted lines in the lower position. Webs 68ª project from the slides and receive pivotally, as indicated at 67ᵇ, the shafts 22ª of barrels 20ᵇ.

In the operative position of FIGURE 13, a latch 36ᵈ retains the parts in the full line position of this FIGURE 13 which is the operative position of the barrel 20ᵇ in a tank.

The dumping position is shown in broken lines arrived at on the descent of the slide 24ᶜ in the vertical guides 27ᶜ.

The modified form of unload station shown in FIGURE 13 may be employed in lieu of the unload station shown in FIGURES 3 and 4. The cradle or support for the perforated cylinder 20ᵇ is designated generally at 79 and consists of a base or floor support 80 having upright standards 81, 82, there being two sets of such standards as shown in FIGURE 14.

At the top of the standards 81, 82 are channel tracks 83, 84, for receiving and confining rollers 85 for guiding a cylinder cradle assembly frame 86. Secured to the cylinder assembly cradle frame 86 is an electric motor 87 which drives a pulley 88 which is connected to drive cylinder contact rollers 89 and 90 by V-belts 91, 92 so that as the elevator in FIGURE 13 is lowered the barrel rim 93 which engages the rollers 89, 90 will compel the entire slide assembly 86 to move from the solid line position in FIGURE 13 to the dotted line position.

As seen in the dotted line position the barrel is then tilted to a dumping position and upon energizing the motor 87, the barrel contact rollers 89 and 90 will impart rotation to the barrel 20ᵇ to facilitate dumping of the contents of the barrel 20ᵇ into a container 54 for the finished parts.

Figure 15:
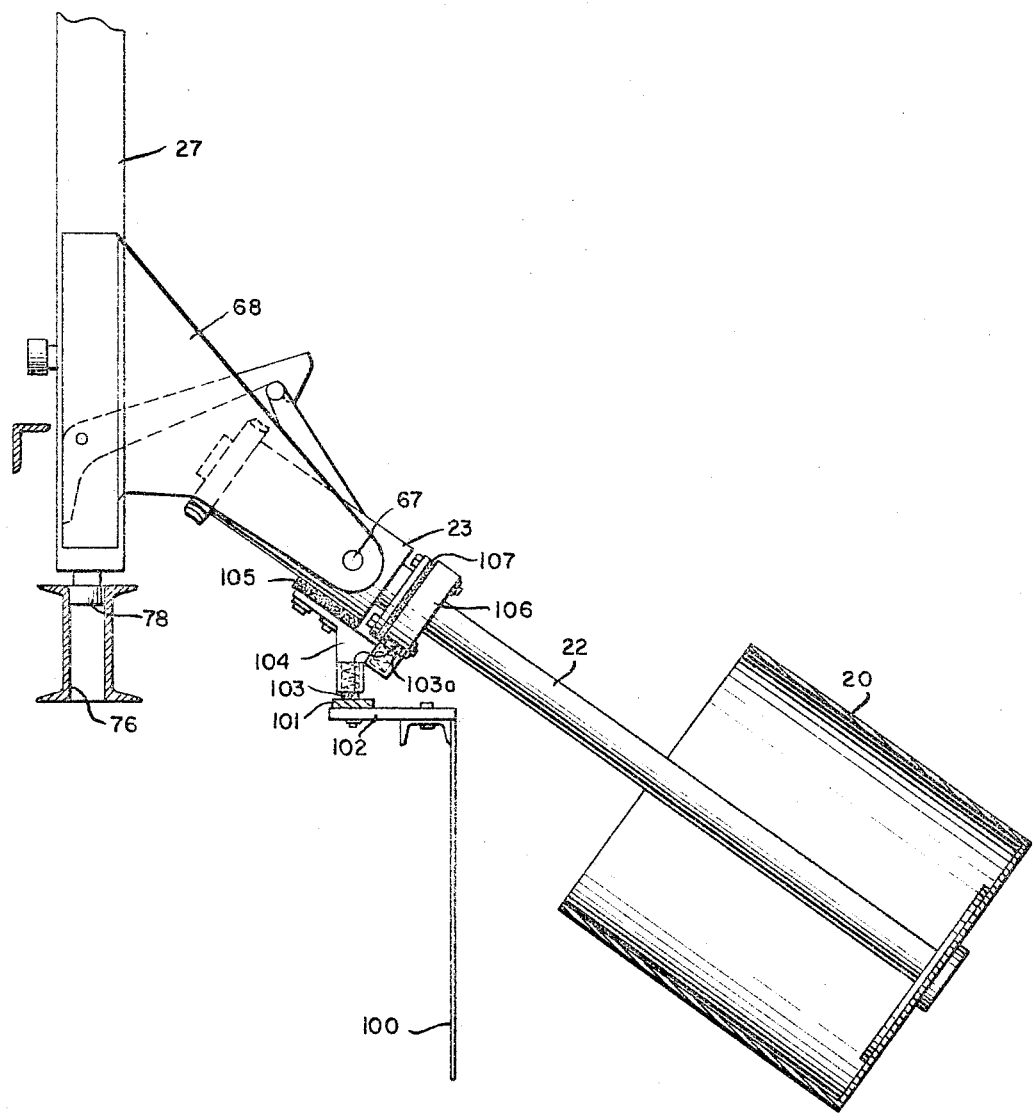
FIGURE 15 is a side elevational view with the barrel and associated parts shown in full lines in operative position in an electroplating tank in which the barrel support is shown electrified.

As shown in FIGURE 15, the barrel support may be modified for electroplating application of this invention. Such modification includes provision of a low voltage, high current bus bar 101 carried by an insulating support 102 on an electroplating tank 100. The current path to the barrel 20 is through a brush 103 carried by a brush assembly 104 which is mechanically secured to the bearing 23 with an insulating member 105 therebetween. The electrical energy is communicated from the brush 103 through its conventional pigtail connection to a brush 103ª which is in electrical contact with a slip ring assembly 106. The barrel 20 and its shaft 22 are electrically insulated from the bearing 23 by means of an insulating member 107.

Although we have disclosed herein the best forms of the invention known to us at this time, we reserve the right to all such modifications and changes as may come within the scope of the following claims.

What is claimed is:

1. In a machine for the treatment of small articles in which a barrel through its shaft and shaft bearing is carried in a normal operative attitude by a carriage which is raised and lowered by an elevating mechanism and moved around horizontally by conveying mechanism to positions over treatment tanks into which the barrel is sequentially lowered throughout a cycle of treatments, the improvement comprising
   (a) support means for the barrel shaft having pivotal connection to said carriage for permitting of a lowering movement of the barrel below normal operative attitude to present the open end of the barrel upwardly for loading, and
   (b) detachable means between said carriage and support means for normally retaining the barrel in normal operative position.

2. The improvement as claimed in claim 1, in which the detachable means is
   (c) a latch movably mounted on said carriage,
   (d) a latch strike on said support means, and
   (e) tripping means at the load station of the machine positioned to trip the latch and release the support means permitting said lowering movement of the barrel.

3. The improvement as claimed in claim 1, further comprising
   (c) controllable lowering means for lowering said barrel.

4. The improvement as claimed in claim 3, in which the lowering means
   (d) subsequently acts to raise the barrel to normal operative attitude in which the barrel will then be engaged and restrained by said detachable means.

5. In a machine for the treatment of articles in which a barrel through its shaft and shaft bearing is carried in a normal operative attitude from a carriage, raised and lowered by an elevating mechanism and moved horizontally by conveying mechanism to positions over treatment tanks, the improvement comprising
   (a) an intermediate plate hinged at a lower portion thereof to the lower portion of the carriage,
   (b) latch means between the carriage and said intermediate plate for normally holding the plate in an elevated position,
   (c) an outer plate directly carrying the barrel shaft bearing hinged at an upper portion thereof to the upper portion of the intermediate plate and adapted to swing outwardly and upwardly from the intermediate plate,
   (d) so that when the latch means is fastened the barrel is free to swing outwardly and upwardly to a position where its open end is presented substantially downward for unloading and when the latch means is released the barrel including both plates may swing outwardly and downwardly to a position for loading in which its open end is presented substantially upwardly.

6. The improvement as claimed in claim 5, further comprising
   (e) tripping means at the load station for tripping the latch means, and
   (f) raising means at the unload station for rotating the outer plate about its pivot and elevating said barrel above said carriage pivot to the unloading attitude.

7. The improvement as claimed in claim 5, further comprising
   (e) means at the loading station for elevating the barrel to operative attitude and the intermediate plate to latching position after loading.

8. The improvement as claimed in claim 7, further comprising
   (f) raising means at the unload station for engaging a lower portion of the outer plate to rotate the plate and entrained barrel about the hinge connection between the plates to a raised position in which the open end of the barrel will be presented downwardly for unloading the contents.

9. In a machine for the treatment of articles in which a barrel through its shaft and shaft bearing is carried in a normal operative attitude from a vertical roller carriage, raised and lowered by an elevating mechanism and moved around horizontally by conveying mechanism to positions over treatment tanks into which the barrel is sequentially lowered throughout a cycle of treatments, the improvement comprising
   (a) support means for the barrel shaft having pivotal connection to the roller carriage for permitting of a lowering movement of the barrel below normal operative attitude and a raising movement of the barrel above normal operative attitude for loading and unloading respectively,
   (b) means for so lowering the barrel at the load station, and
   (c) means for so raising the barrel at the unload station of the machine.

10. The improvement as claimed in claim 9, further comprising
    (d) a latch member supported from the carriage in position to encounter said pivotal connection to retain the barrel in normal operative attitude.

11. The improvement as claimed in claim 9, further comprising
    (d) means for shifting the slide at least partially inwardly of the machine to withdraw its support permitting of the lowering movement of the barrel.

12. The improvement as claimed in claim 11, further comprising
    (e) offset guide members for permitting of such inward movement of the slide.

13. In a machine for the treatment of small articles in which a barrel through its shaft and shaft bearing is carried in a normal operative attitude from a vertical slide raised and lowered by an elevating mechanism and moved around horizontally by conveying mechanism to positions over treatment tanks into which the barrel is sequentially lowered throughout a cycle of treatments, the improvement comprising
    (a) guide means in which the slide is vertically shiftable, said guide means having
    (b) an inwardly offset portion for permitting entry thereto of a lower portion of the slide to allow the slide to assume a diagonal position lowering said shaft to a dropped attitude lower than normal to further expose the barrel for filling at an upright position.

14. The improvement as claimed in claim 13, further comprising
    (c) stop means carried by said pivoted shaft for impinging the slide for retaining the barrel in a normal operative attitude when the slides are in vertical positions, and
    (d) said slides in the diagonal position permitting the stop means to move inwardly allowing sequential dropping movement of the barrel below normal operative attitude.

15. The improvement as claimed in claim 13, further comprising
    (c) means at an unload station for lifting said shaft above normal operative attitude to a position for dumping the contents of the barrel.

16. The improvement as claimed in claim 15, further comprising
    (e) means for moving said shaft upwardly to a position where the stop means is withdrawn from the slides and the barrel is shifted to an unload position.

17. In an article treating machine of the character described,
    (a) a horizontally travelling vertically reciprocable slide,
    (b) an article carrying barrel,
    (c) a support shaft for the barrel,
    (d) a bearing for the shaft pivotally carried by the slide, and
    (e) a cradle slidably movable on the machine at an unload station adapted to receive the barrel and to permit tilting movement of the barrel about the pivotal connection of the bearing with the slide when such slide is lowered to present the open end of the barrel downward to effect discharge of its contents.

18. A machine according to claim 17, further comprising
    (f) means moving with the cradle positioned to be engaged by the barrel for rotating same to facilitate unloading.

19. An article treating machine of the character described, comprising
    (a) an open ended barrel for the articles,
    (b) a shaft carrying the barrel,
    (c) a shaft bearing rotatably receiving and supporting the shaft,
    (d) a carriage pivotally supporting the bearing and the barrel for normal, load and unload angular movements,
    (e) conveying means for moving said carriage and entrained barrel in sequence to load, treatment and unload stations,
    (f) detachable means between the carriage and bearing for normally holding the barrel in treatment position,
    (g) means for disconnecting said last-named means at the load and unload stations,
    (h) means at the load station for permitting the barrel to assume a substantially upright position with its open end uppermost, and
    (i) means at the unload station for upending the closed end of the barrel to dispose the open end downward for discharging the contents.

References Cited by the Examiner

UNITED STATES PATENTS

| 2,148,552 | 2/1939 | Hannon | 204—204 |
| 2,826,288 | 3/1958 | Giaier | 198—19 |

FOREIGN PATENTS 506,627  10/1954  Canada.

EVON C. BLUNK, *Primary Examiner.*

RICHARD E. AEGERTER, HUGO O. SCHULZ,
*Examiners.*